US012654385B2

(12) United States Patent
Ottowitz et al.

(10) Patent No.: US 12,654,385 B2
(45) Date of Patent: Jun. 16, 2026

(54) MOLD BODY FOR A BLOW MOLD, AND BLOW MOLD

(71) Applicant: ALPLA Werke Alwin Lehner GmbH & Co. KG, Hard (AT)

(72) Inventors: Martin Ottowitz, Hard (AT); Daniel Pielmeier, Hard (AT)

(73) Assignee: Alpla Werke Alwin Lehner GmbH & Co., KG, Hard (AT)

( * ) Notice: Subject to any disclaimer, the term of this patent is extended or adjusted under 35 U.S.C. 154(b) by 157 days.

(21) Appl. No.: 18/259,421

(22) PCT Filed: Dec. 23, 2021

(86) PCT No.: PCT/EP2021/087491
§ 371 (c)(1),
(2) Date: Jun. 27, 2023

(87) PCT Pub. No.: WO2022/144298
PCT Pub. Date: Jul. 7, 2022

(65) Prior Publication Data
US 2024/0059003 A1 Feb. 22, 2024

(30) Foreign Application Priority Data

Dec. 28, 2020 (CH) ...................................... 1676/20

(51) Int. Cl.
*B29C 49/48* (2006.01)
*B29C 33/38* (2006.01)
(Continued)

(52) U.S. Cl.
CPC .......... *B29C 49/4823* (2013.01); *B29C 49/04* (2013.01); *B29C 49/482* (2013.01);
(Continued)

(58) Field of Classification Search
CPC .......... B29C 49/482; B29C 49/494817; B29C 2049/483; B29C 2049/4846
See application file for complete search history.

(56) References Cited

U.S. PATENT DOCUMENTS 10,195,780 B2   2/2019   Langlois et al.
10,252,459 B2   4/2019   Langlois et al.
(Continued)

FOREIGN PATENT DOCUMENTS

CH      716011 A1 *   9/2020   ............. B29C 49/30
CN   205969934 U   2/2017
(Continued)

OTHER PUBLICATIONS

International Search Report Corresponding to PCT/EP2021/087491 mailed Apr. 11, 2022.
(Continued)

*Primary Examiner* — Virak Nguon
(74) *Attorney, Agent, or Firm* — Finch & Maloney PLLC

(57) ABSTRACT

A mold body (10) for a blow mold (1). The mold body (10) has a bottom region (14), a shoulder region (13), a central region (15) and a separating plane (12). At least one mold cavity (11) has an inner wall (111) situated in the mold body (10). At least one temperature control channel (30) is arranged in the mold body (10). The at least one temperature control channel (30) is situated and/or positioned in the mold body (10) in such a way as to remove more heat from or supply more heat to a first region (112) of the inner wall (111) than a second region (113) of the inner wall (111) that is adjacent to the first region (112).

21 Claims, 3 Drawing Sheets

Figures 1, 2:
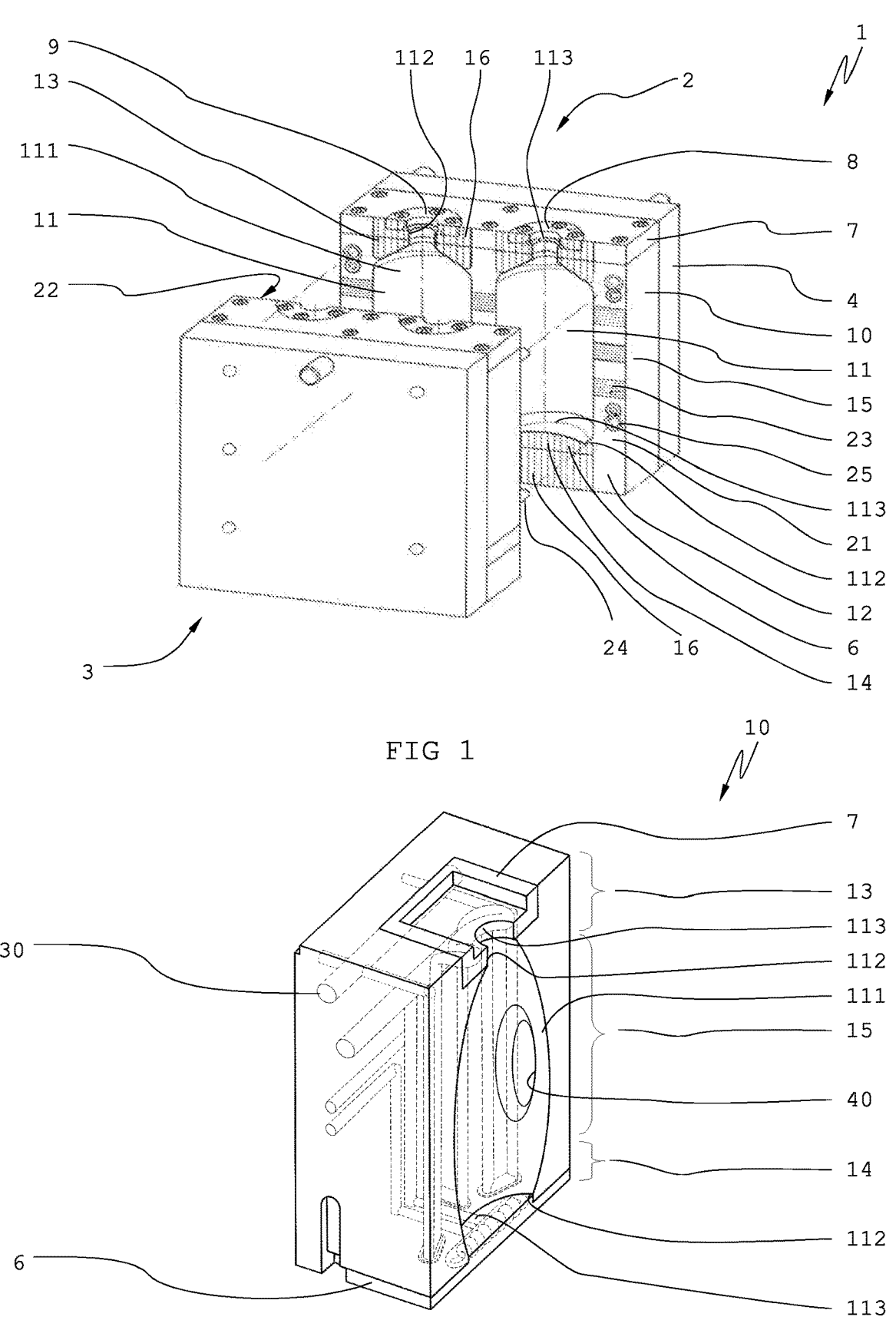

(51) Int. Cl.
  *B29C 49/04* (2006.01)
  *B29L 31/00* (2006.01)
  *B33Y 80/00* (2015.01)

(52) U.S. Cl.
  CPC .......... *B33Y 80/00* (2014.12); *B29C 33/3842* (2013.01); *B29C 2049/483* (2013.01); *B29C 2049/4846* (2013.01); *B29L 2031/7158* (2013.01)

(56) References Cited

U.S. PATENT DOCUMENTS

| | | | | |
|---|---|---|---|---|
| 2014/0034658 A1* | 2/2014 | Treece | ............... | B29C 49/4817 |
| | | | | 425/527 |
| 2021/0146596 A1* | 5/2021 | Lee | ......................... | B29C 49/80 |
| 2022/0234274 A1 | 7/2022 | Kunz et al. | | |

FOREIGN PATENT DOCUMENTS

| | | | | | |
|---|---|---|---|---|---|
| CN | 210390079 U | 4/2020 | | | |
| CN | 112060545 A | 12/2020 | | | |
| DE | 43 27 363 A1 | 2/1995 | | | |
| DE | 102004002193 A1 * | 8/2005 | ......... | B29C 49/4817 | |
| EP | 3 083 191 B1 | 10/2016 | | | |
| EP | 3 083 190 B1 | 7/2020 | | | |
| FR | 3 088 234 A1 | 5/2020 | | | |
| WO | 2020/201063 A1 | 10/2020 | | | |

OTHER PUBLICATIONS

Written Opinion Corresponding to PCT/EP2021/087491 mailed Apr. 11, 2022.

* cited by examiner

16

2

10

13

11

111

14

I

VI          VI

I 16   40      d3   α   41   21

40          d4   2

16   41      FIG. 6      3

12

MOLD BODY FOR A BLOW MOLD, AND BLOW MOLD

The present invention relates to a mold body for a blow mold, and a blow mold comprising a mold body according to the preamble of the independent claims.

Various methods and devices for forming a container and therefore corresponding molded bodies are known from the prior art.

The production of hollow plastic containers is typically accomplished by so-called blow molding methods. The most common blow molding methods are extrusion blow molding and stretch blow molding. Both blow molding methods have in common that the final shape of a plastic container is given in a blow mold.

Single-layer or multilayer plastic containers, for example made of polyolefins, are often produced in an extrusion blow-molding method, in particular in a parison-based blow-molding method. In this case, an extrusion head is normally used to continuously extrude a plastic parison which can be formed in one or more layers. The plastic parison is introduced sectionally as a parison section into a mold cavity of a blow mold, brought into the desired shape by means of a blowing medium introduced under overpressure, cooled, and demolded. In this method, a slug, which is separated in a further step, usually remains after the blowing in the region of the container base and/or the container shoulder.

A further, very frequently used production method for plastic containers is stretch blow-molding. In this method, a so-called preform, which mostly has an elongated tubular shape and a bottom at its one longitudinal end, and at the other longitudinal end a neck region with shaped fastening elements for a closure cap, for example threaded sections and a opening, is inserted into a mold cavity of a blow mold and brought into the desired shape by a blowing medium introduced at overpressure. In this case, the preform is additionally stretched in the axial direction with a stretching mandrel inserted through the neck opening. After the stretching/blowing process, the finished plastic container is cooled and demolded from the blow mold.

The extruded parison and also the preform are sometimes referred to as preforms in their respective methods.

A blow mold is typically formed from two tool halves, wherein the construction can also be more than two parts. These are then no longer tool halves, but rather tool elements or tool parts. For the sake of simplicity, the term tool half is also used in the present case for non-half divisions of the blow mold.

The blow mold has a mold body with a cavity and therefore provides a so-called mold cavity for shaping a container. Depending on the container shape, this mold cavity is symmetrical or asymmetrical. In the case of asymmetrical shapes, the two or more tool halves can be divided in such a way that their parting lines are formed at preferred locations of the subsequent container and accordingly do not necessarily have to be divided into uniform fractions.

The tool halves are periodically opened, closed, and opened again in the extrusion blow molding method (EBM method) in order to introduce a preform into the mold cavity and demold the finished container after inflation.

A blow mold for a container is typically divided into three regions: a bottom region, a central region and a neck/shoulder region. A finished container typically has a container base, a container body and a container shoulder with a neck. The neck ends with a pouring opening. The neck typically has means for fastening a closure, for example a thread or thread segments for the keyed fixation of a twist lock. The container shoulder is typically inflated only below the neck while blow molding the container. Following the container shoulder, in other words between the container shoulder and the container base, the container body is inflated. This substantially corresponds to the center region of a blow mold. The container bottom in turn is created in the bottom region. The neck itself is designed as an injection-molded part in the stretch blow molding method (SBM method). In the extrusion blow molding method, the base and usually also the neck are essentially formed by pressing the parison while manufacturing the container. The parison sections pressed together, which generally have twice the wall thickness of the parison, are called slugs. These are generally separated from the hollow blown body after removal of the hollow blown body or container from the blow mold. The EBM and SBM production methods can be distinguished by the finished product. Accordingly, a product which is manufactured in the SBM method and therefore from a preform generally has an injection point. A product which is produced in the EBM method and therefore from a preform formed as an extruded parison has visible seams in the bottom region and/or shoulder/neck region, which extend along the partition of the mold halves and are formed by the separation of the slugs. Preforms manufactured using the EBM method occupy a hybrid position. However, seams which were formed during the manufacture of the preform are also visible in this case on the finished product.

The mold construction is subject to different restrictions. On the one hand, this concerns requirements relating to the blow mold itself. For example, these have to have cooling channels, which in turn requires, for example, a minimum size of the blow mold. On the other hand, this relates to requirements that are predetermined by the later form of a container and/or by the material thereof.

Depending on the shape of the subsequent container, the mold body of the blow mold has different wall thicknesses in order, on the one hand, to obtain for example the necessary strength and, on the other hand, to provide corresponding fastening points or force application points on the mold body or connection points for a cooling circuit.

Extrusion blow-molded parisons of polyolefins are typically introduced into the blow mold at a temperature of 180° Celsius with a deviation of up to 20° K; preforms made of polyethylene terephthalate are typically inserted into the blow mold at temperatures of approximately 100° Celsius. Since plastic is known to be a poor heat conductor, the plastic container must be cooled down by the blow mold at the end of the blow molding method before it is demolded to such an extent that the residual heat stored by the wall of the container cannot cause the plastic container removed from the blow mold to be deformed.

Polyolefins are typically demolded at about 60° Celsius, wherein the temperature at the neck is still about 80° Celsius. Polyethylene terephthalate is demolded when the container body has a temperature of approximately 30° Celsius, wherein the neck region, the bottom region and, if present, also the handle region can have a higher temperature of approximately 60° Celsius. In other words, the shaped body has different temperatures in different regions and consequently no uniform material properties at this time.

It is therefore an object to provide a blow mold and/or a hollow blown body produced in particular in the extrusion blow molding method, which is largely stress-free during removal from the blow mold, in particular in the neck region.

This object is solved by the devices defined in the independent claims. Further embodiments emerge from the dependent claims.

According to a first embodiment of the invention, a mold body for a blow mold, in particular an extrusion blow mold, has a bottom region, a shoulder region, a central region and a separating plane. At least one mold cavity with an inner wall is arranged in the mold body. At least one temperature control channel is arranged in the mold body. The at least one temperature control channel is arranged in the mold body and/or is configured to extract from or supply more heat to a first region of the inner wall than a second region of the inner wall which is adjacent to the first region.

The possibility of extracting or supplying different amounts of heat from/to the inner wall of the mold cavity at different regions means that different amounts of heat can be extracted from or supplied to a hollow blown body at different regions of its outer wall, which is adjacent to the inner wall of the mold cavity after the hollow blow molding has been produced and before demolding. With regard to heat removal, more heat can be removed from the regions of the hollow blown body which are designed to be thicker-walled, such as, for example, the neck/shoulder region, the bottom region or also the handle region as the remaining container body, than said remaining container body. An accumulation of material arises precisely in the neck region since the neck region is not thinned by the blowing when shaping the neck region from a parison during extrusion blow molding. With the proposed mold body, in the ideal case within the hollow blown body, a uniform temperature distribution can be achieved during demolding which can counteract a distortion due to an uneven temperature distribution as can occur with hollow blown bodies according to the prior art. This can mean that, with the proposed hollow blown body after its removal from the mold body, the temperature gradient between the region with the smallest material input and the region with the largest material input at the time of adjusting the temperature of the inner wall to the temperature of the outer wall of the respective region of the hollow blown body, that is to say the heat stored in the walls of the respective regions, has been discharged almost completely to the respective inner wall and outer wall, and is ideally no longer present. This can be independent of whether the temperature gradient is measured at the outer wall, the inner wall or in the wall of the hollow blown body. The temperature of the inner wall and/or the outer wall is significantly above the ambient temperature at the time of the adjustment. As a result, the hollow blown body can be removed earlier from the proposed mold body than would be the case with a mold body according to the prior art. By saving cycle time, a hollow blown body with the proposed mold body can be produced more cost-effectively than with a mold body according to the prior art.

If the cooling is accomplished via a single temperature control channel, the one temperature control channel can be arranged in such a way that, with the same cross-section, it passes closer to the first region of the inner wall of the mold cavity than to the second region. The one temperature control channel can also be designed such that it is spaced apart almost identically from the inner wall in the first region and in the second region, but the flow rate of the temperature control fluid in the temperature control channel for cooling the first region is higher than the flow rate for cooling the second region. A higher flow rate of the temperature control fluid generally results in more heat than a lower one. A higher flow rate can be generated, for example, by reducing the flow cross section of the temperature control channel.

Furthermore, the temperature control channel in the first region can be guided several times over the first region in order to increase a packing density of the temperature control channel relative to the second region, which ultimately causes a higher removal of heat at the first region in comparison to the second region. In general, more heat can be extracted from the inner wall of the mold cavity if the flow cross section is increased at the same flow rate since this causes more temperature control fluid to pass through the temperature control channel. Furthermore, the at least one temperature control channel can be used to supply heat to the first and second regions of the inner wall.

According to a further embodiment of the invention, the first region of the inner wall adjoins the separating plane, and the second region of the inner wall is substantially perpendicular to the separating plane. For example, the one temperature control channel may extend from a left side of the separating plane facing a blow mold installed in a blow molding machine with a smaller cross-section over the first region of the inner wall, with a larger cross-section over the second region of the inner wall, and again with a smaller cross-section over the first region of the inner wall of the right side opposite the left side. If, for example, two temperature control channels are present, the left and right side first region can be cooled with the one temperature control channel, for example, and the second temperature control channel can be used to cool the second region, wherein the cross sections of the two temperature control channels can be different. The first and second temperature control channels can also be created from a common temperature control channel by branching, and/or the first and the second temperature control channel can be combined to form a common temperature control channel. The embodiments described with reference to one and two temperature control channels can be applied to three and more temperature control channels. The above statements apply analogously if the temperature control channel(s) are used for supplying heat.

According to a further embodiment of the invention, the withdrawal and/or the supply of heat decreases steadily from/to the first region of the inner wall to the second region of the inner wall, and vice versa. As a result, a substantially homogeneous temperature distribution can be generated on the hollow blown body between a first region of the hollow blown body corresponding to the first region of the inner wall of the mold cavity and a second region of the hollow blown body corresponding to the second region of the inner wall of the mold cavity, directly after removal from the blow mold.

According to one embodiment, the one temperature control channel with a constant cross section can extend from the left side of the separating plane facing a blow mold installed in a blow molding machine over the first region of the inner wall with steadily increasing spacing from the inner wall of the mold cavity up to a maximum of the spacing in the second region of the inner wall, and from there with a steadily decreasing spacing up to the first region of the inner wall of the right side opposite the left side.

According to a further embodiment, the temperature control channel from the first region of the left-side separating plane over the second region up to the right-side separating plane can be uniformly spaced from the inner wall. The cross section of this temperature control channel can then steadily increase from the left-side first region to the second region and steadily decrease from there to the right-side first region.

According to a further exemplary embodiment of the invention, the at least one temperature control channel has a non-circular cross section which is constant at least in one section, in particular an elliptical or oval cross section. The section with the non-circular cross section is arranged twisted in the mold body. The constant non-circular cross section of the temperature control channel can ensure that the flow rate of the temperature control fluid is substantially constant. It is not necessary for the geometric shape of the section to be the same in spite of a constant cross-sectional area from the start to the end. Furthermore, it is irrelevant whether the at least one section with the constant non-circular cross section is uniformly or unevenly spaced from the inner wall of the mold cavity. The mode of action will be explained with reference to an elliptical section. An ellipse has four vertex curvature circles, wherein two vertex curvature circles each lie diametrically opposite one another and have the same radius. However, the two radii are different. The torsion of the elliptical section of the one temperature control channel can cause a first region of the section with the larger of the two radii of the vertex curvature circles to be guided along the first region of the mold cavity in order to draw or supply more heat there than a second region of the mold cavity adjacent to the first region of the mold cavity, along which a second region of the section with the smaller of the two radii of the vertex curvature circles is guided. This effect of heat supply or heat extraction can, on the one hand, be reinforced by a large difference between the two radii of the vertex curvature circles and, on the other hand, in that a first distance between the first region of the section and the inner wall of the mold cavity is smaller than a second distance between the second region of the section and the inner wall of the mold cavity. It is understood that the implementation of this idea is not limited to an elliptical or oval cross-sectional shape. Rather, this embodiment can be applied to all cross-sectional shapes, the distance of which from a centroid to a first section of the boundary edge of the cross-sectional shape is unequal to a distance from the centroid to a second section of the boundary edge of the cross-sectional shape, wherein the first distance and the second distance are different from one another.

According to a further embodiment of the invention, the extraction of heat through the at least one temperature control channel from a slug chamber arranged in the mold cavity and/or from a slug chamber adjacent to the mold cavity, which slug chamber is formed in the mold body at the separating plane and is connected to the mold cavity via a gap formed by a pinch edge, is greater than from the second region. The first region therefore concerns the slug chamber. Slug chambers are manufactured into the mold body at the mold separating plane. The slug is formed in the slug chambers and represents excess material that is produced during the manufacture of a hollow blown body by squeezing the parison which is moved into the mold cavity and, as already stated, has approximately twice the wall thickness of the inserted parison and therefore has a considerably higher heat content than the hollow blow body itself the wall thickness of which was also reduced by the blow molding method compared to the wall thickness of the parison inserted into the mold cavity. Due to its heat content via the connection to the hollow blown body, this slug can additionally supply heat to the hollow blown body. Slugs generally remain on the hollow blown body when the hollow blown body is removed from the mold body, and are only removed in a separate step after the hollow blown body has been removed. The inner wall of slug chambers generally has spikes extending into the vicinity of the mold cavity and are arranged such that an S-shaped profile is formed on the slug in plan view. This means that an elevation formed as a spike in one half of the mold is opposed by a recess formed as a channel in the other half of the mold which is opposite the first half of the mold. The aim of this arrangement is, on the one hand, the best possible pressing of the parison walls against each other and full-surface contact with the wall of the slug chamber so that its heat can be introduced into the blow mold. On the other hand, the S-shaped profile generates an inherent stability of the slug so that it can easily be removed from the hollow blown body after the removal from the blow mold. The spikes or the channels are parallel to one another in a partial section of the blow mold. This can mean that the spikes or the channels of individual partial sections enclose an angle which can be 90° in a preferred embodiment. The distance between adjacent spikes or adjacent channels within a partial section of the blow mold is identical to ensure a uniform heat input into the blow mold. In addition, the contact surface of the slug to the temperature-controlled tool can be maximized by the formation of channels. Due to the formation of spikes on and channels in the wall of the slug chamber, the surface of the slug chamber can be enlarged relative to a predetermined length in comparison to a design in which the wall of the slug chamber is flat. The depth of the channels results substantially from the wall thickness of the plastic parison and is generally smaller than twice the wall thickness. An angle included between the inner wall of the cavity and a central axis of the spike or channel may be between greater than 0° and 90°, preferably between about 30° and 90°. Ideally, the angle is between approximately 45° and 90°. The withdrawal of the heat from the slugs leads to a reduced slug temperature and therefore to a homogeneous temperature distribution on the hollow blown body directly after removal from the blow mold. The hollow blown body can be designed, for example, as a container or a bottle. Especially the reduced slug temperature can prevent a low inherent stiffness of the slug. An excessively low inherent stiffness of the slug can cause the slug to tip over after demolding the hollow blown body and therefore to adhere with the hollow blown body. A non-solidified slug can also lead to problems during grinding in the mill, in particular to smearing of the blades. The removal of a slug with insufficient inherent stiffness regularly results in, while cutting off, frayed edges on the hollow blown body at the original connection points of the slug on the hollow blown body. While the frayed edges in the bottom region or shoulder region can possibly still be regarded as a blemish, the frayed edges in the region of handles regularly lead to a negative haptic experience for the user, which is at least considered by the user to be a lack of quality of the hollow blown body.

According to a further embodiment of the invention, the at least one temperature control channel is produced at least partially in an additive manufacturing method. The generative formation of temperature control channels in the mold body makes it possible to form the temperature control channels freely in the mold, for example, wherein, in particular, curved shapes are possible or flow cross-sections that deviate from a round shape. Such designs are not possible, for example, with conventional molding bodies since no change in direction is possible in cooling holes. By forming the temperature control channels in generative methods, it is also possible to reach locations which are not reachable with cooling holes and are, for example, in receding or projecting regions of the mold body. It is also possible to constantly maintain a specific distance to an inner wall of the mold cavity. In a conventional mold body with cooling holes, the cooling holes are typically arranged parallel to a central axis of the mold body or the mold cavity. Depending on the design or shape of the inner wall, it is more or less spaced from the cooling hole according to its distance to the central axis. With temperature control channels which are produced in the generative method, an individual spacing of the temperature control channel to the inner wall of the mold body is also possible with curved inner walls.

The contour of a hollow blown body, for example constrictions, can be better followed given the option of changing the cross-sectional shape of the at least one temperature control channel. In order to produce intersecting temperature control channels with conventional cooling holes, for example, they have to be drilled into the molded bodies from different sides, and the respective inlet openings have to be closed again afterwards. This disadvantage can also be remedied by the generative manufacture of a temperature control channel. Separate openings in the mold body can be avoided. In this case, it can be provided in particular that the temperature control channels can be arranged closer to the respective inner wall in regions with high heat input than in regions with lower heat input. When the at least one temperature control channel with a constant cross-section is fed temperature control fluid, more heat can be removed from regions in which the at least one temperature control channel is arranged closer to the respective inner wall, than from regions in which the temperature control channel or temperature control channels are arranged at a greater distance from the inner wall. In sum, this results in a substantially uniform temperature over the entire surface of the blown container. After removal from the mold body, the body of the container ideally has no or only small temperature gradients.

It can be provided that the temperature control channels are arranged in the region of the subsequent slugs and/or in the region of the separating plane near the surface, and that their distance changes continuously toward a plane at 90° to the separating plane so that their distance in this region is the furthest distance of the temperature control channels from the inner wall. In addition or alternatively, this effect can be intensified in which, in regions with high heat input, for example in the neck/shoulder region, and/or in the bottom region, and/or in the handle region, and/or in the region of the separating plane, a cross-section of a first temperature control channel is larger than a cross-section of a second temperature control channel arranged in a region with a low temperature input, so that more heat can be absorbed by the temperature control fluid in the first temperature control channel than in the second temperature control channel.

The at least one temperature control channel is preferably arranged in the neck region and/or shoulder region of the mold body. In particular in the extrusion blow molding method, a high heat input arises in the neck region and/or shoulder region of the mold body. This can also be a region in which a slug is formed. In other words, more material of the preform with a high temperature is present in this region, and the mold body is accordingly subjected to increased heat input in this region. In addition, this region is located close to the extrusion head which radiates heat. This circumstance can be countered by the formation of the at least one temperature control channel in the shoulder region. The heat from the slug, or from the neck and/or shoulder region, can be discharged better and in particular faster compared to conventional holes.

The at least one temperature control channel is additionally or alternatively arranged in the bottom region of the mold body. In particular in the extrusion blow molding method, a high heat input arises in the bottom region of the mold body. This is also a region in which a slug is formed. In other words, more material of the preform with a high temperature is present in this region, and the mold body is accordingly subjected to increased heat input in this region. This circumstance can be countered by the formation of the temperature control channel in the bottom region. The heat from the slug, or from the bottom region, can be discharged better and in particular faster compared to conventional holes.

In particular, it can be provided that the at least one temperature control channel is additionally or alternatively arranged in the mold body in the region of the slug chamber. This guidance of the at least one temperature control channel in the region of the slug chamber enables improved heat dissipation from the separating plane which is typically solid in order to be able to close the molded bodies precisely and without a gap. By forming an additive temperature control channel in the region of the separating plane, it is possible to dispense with additional holes from the outside into the mold body, which can constitute a weakening of the mold body.

According to a further embodiment of the invention, the at least one temperature control channel is arranged in a handle region. In the extrusion blow molding method, a handle can be formed by virtue of the fact that inner walls of the parison or preform which has entered the blow mold are pressed against one another in the shape of the handle, and welded together and therefore form a slug. In this region, more material of the preform is therefore present at a high temperature, and the mold body is accordingly subjected to increased heat input in this region. This circumstance can be countered by the formation of the at least one temperature control channel in the handle region. The heat from the slug, or from the handle region, can be discharged better and in particular faster compared to conventional holes. In addition, the at least one temperature control channel can be guided along the inner wall of the mold cavity or the slug chamber of the handle region.

Preferably, a wall thickness between the at least one temperature control channel and the corresponding inner wall, and/or the corresponding separating plane, and/or slug chamber is at least 1.5 mm. In other words, there is a minimum material thickness between the outer contour of the mold body and the temperature control fluid of at least 1.5 mm. This dimensioning guarantees a minimum strength caused by the minimum wall thickness.

It can be provided that the mold body is formed in multiple parts and the neck/shoulder region, and/or the bottom region, and/or handle region or parts thereof are formed separately. In this case, for example, the neck/shoulder region can be formed together with the central region, or the bottom region together with the central region. It goes without saying that the central region can also be designed separately and independently. In general, a handle region if present is arranged in the central region. The neck/shoulder region, and/or the bottom region, and/or the handle region can also be designed as separate insert parts which can be inserted into the mold body. The insert parts can also be produced from a different material than the central region. For example, the central region can be made of aluminum, and one or more insert parts can be made of steel. Working with insert parts in particular enables simple and specific fabrication of the individual regions as well as easy replacement in the event of servicing. It can also be provided, for example, that, depending on the shape of the container to be blown, an additively produced temperature control channel is arranged only in one of the three regions since this is unnecessary, for example, in other regions.

It is therefore conceivable that the at least one temperature control channel is arranged in the neck/shoulder region, and the neck/shoulder region is produced in an additive manufacturing method, and/or the at least one temperature control channel is arranged in the bottom region, and the bottom region is produced in an additive manufacturing method, and/or the at least one temperature control channel is arranged in the handle region, and the handle region is produced in an additive manufacturing method. It goes without saying that this is also possible for the central region. As a result of the generative production of a complete region including the respective at least one temperature control channel, this region can be individually adapted to the anticipated heat input or heat output or to the desired heat removal or heat supply and can be produced accordingly.

In this case, it can be provided that the mold body has a central region which is produced conventionally and/or generatively. Conventional production is advantageous in particular given a relatively simple geometry of containers, for example with containers the central part of which is substantially cylindrical, and the entire central region of a mold body is therefore uniformly exposed to heat. Accordingly, the presence of conventional cooling holes is sufficient for the heat dissipation from the central region of the mold body in such a case. These are preferably arranged in corresponding alignment with generatively produced temperature control channels in the base area and/or neck/shoulder area so that all temperature control channels together form one or more temperature control circuits.

Generative manufacturing is suitable when the container has a complex geometry, in particular one or more constrictions, projections and/or recesses. Here, the at least one temperature control channel can be guided parallel to the inner wall of the mold cavity of the central region in the direction of a mold cavity axis. The at least one temperature control channel can also be formed helically following the inner wall of the mold cavity.

It can be provided that the at least one temperature control channel has a cross section which varies along the flow direction. This can be a change in the shape of the cross section and/or a change in the area of the cross section. Different flow rates can be set by changing the area of the cross section. With a constant flow volume, a widening cross-section results in a slowing of the flow, and the temperature-control fluid can absorb a smaller amount of heat due to a longer dwell time than with a faster flow. By changing the geometric shape of the cross section, it is possible to produce different flows within the flow cross section, in particular turbulences. The turbulences can lead to a better absorption of the thermal energy by the temperature-control fluid and therefore to a better discharge of the thermal energy from the mold body. The temperature control fluid can be a gas or a liquid. In the present case, the flow direction is essentially understood to mean the direction of the temperature-control fluid in which it flows, wherein the flow direction is fixed in each case by points of the centroids of the corresponding flow cross-sections which are lined up next to one another.

Additionally or alternatively, it can be provided that the at least one temperature control channel has a curved, in particular spatially curved, profile. The profile of the at least one temperature control channel is determined on the basis of the definition of the gravity line. The curved profile makes it possible to individually design the heat output from the mold body or the heat input into the mold body. Due to a spatially curved profile, for example a helical profile, the temperature control fluid can be transported away from the inner wall in the direction of a colder region of the mold body and, for example, the heat can be extracted from these loops via an adjacent temperature control hole, or heat can be supplied to the loops if necessary.

It can therefore also be provided that the at least one temperature control channel is designed to meander two-dimensionally or three-dimensionally. Two-dimensional meandering is to be understood to mean that the loops lie substantially in one plane. Three-dimensional meandering is to be understood to mean that the loops are arranged in a space, i.e., also extend into the third dimension in comparison to the arrangement in a plane. Therefore a temperature control channel can extend from a first loop formed in a first plane into a second loop formed in a second plane, wherein the first plane and the second plane enclose an angle. The temperature control channel can therefore be formed of parison bends arranged at random relative to one another, wherein the inlet and outlet of the parison bends can include different angles. Here as well, individual loops arise which enable the absorbed heat to be discharged relatively quickly into regions of the mold body that are further removed from the inner wall of the mold cavity. These loops can also be, for example, in thermal exchange with another temperature control hole, wherein these can be arranged both in a cocurrent and countercurrent.

It can be provided that the bottom region, and/or the neck/shoulder region, and/or the central region, and/or the handle region each have a separate temperature control circuit. It is conceivable that the temperature control circuits in each region are also divided into several separate subcircuits. These temperature control circuits enable the specific temperature control of the individual regions, wherein, for example, different flow rates and/or different flow speeds can be achieved by the separate formation of the temperature control circuits.

The at least one temperature control channel can in particular have at least one, preferably a plurality of, parallel-connected sub-sections. This enables a fine branching of the at least one temperature control channel, which in turn increases the surface along which the temperature control fluid flows. This in turn can promote faster heat output from the mold body or heat input into the mold body.

The generative manufacturing method includes selective laser melting and a thermal spraying method. The temperature control channel can be produced by these manufacturing methods. These production methods are suitable for the production of molded bodies, since a high material quality can be achieved by the cited methods, wherein products produced in this method are essentially free of defects. This is particularly advantageous since the inner walls of molded bodies must have a high surface quality, and this can be achieved with the generative manufacturing methods.

Another aspect of the invention relates to a blow mold comprising at least one mold body as described in the present case, and in particular two complementary mold bodies which form a mold cavity in the closed state.

This makes it possible to provide a complete blow mold which is optimized in relation to temperature dissipation or heat dissipation.

Figure 3:
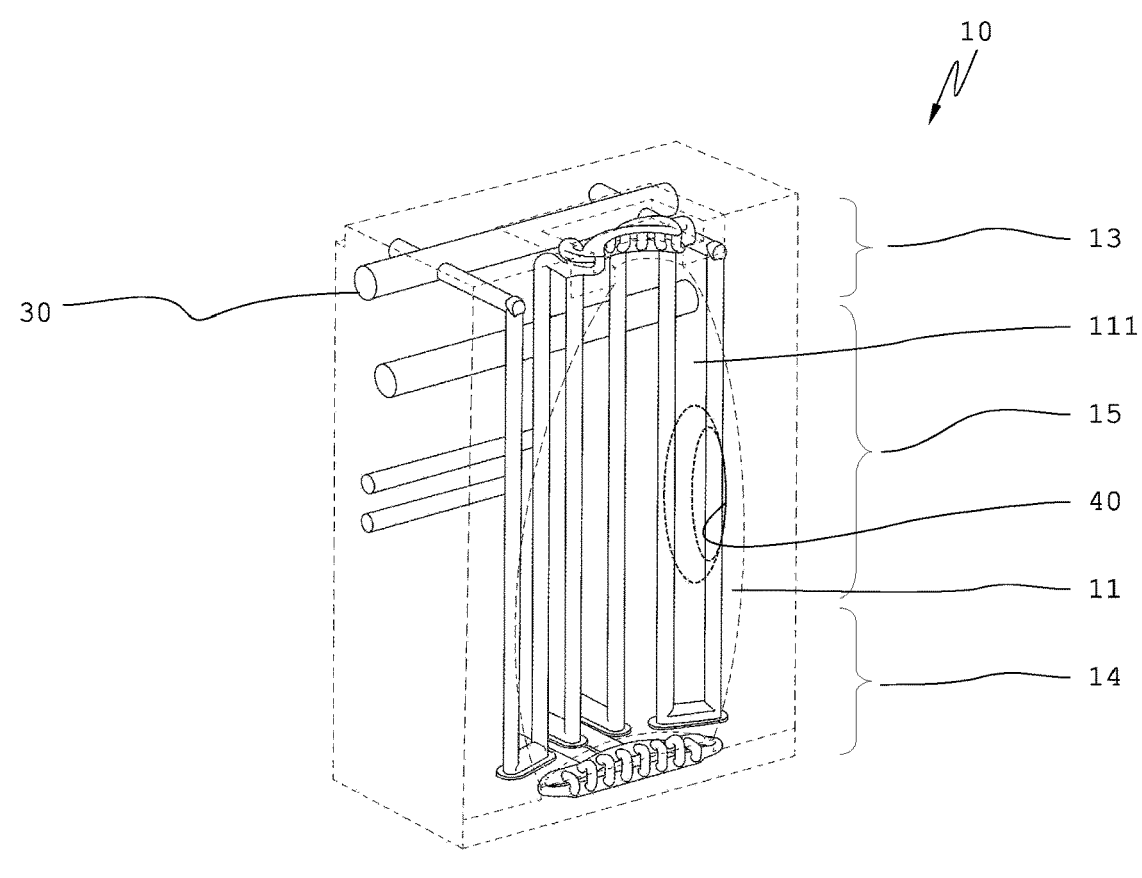
Figure 4:
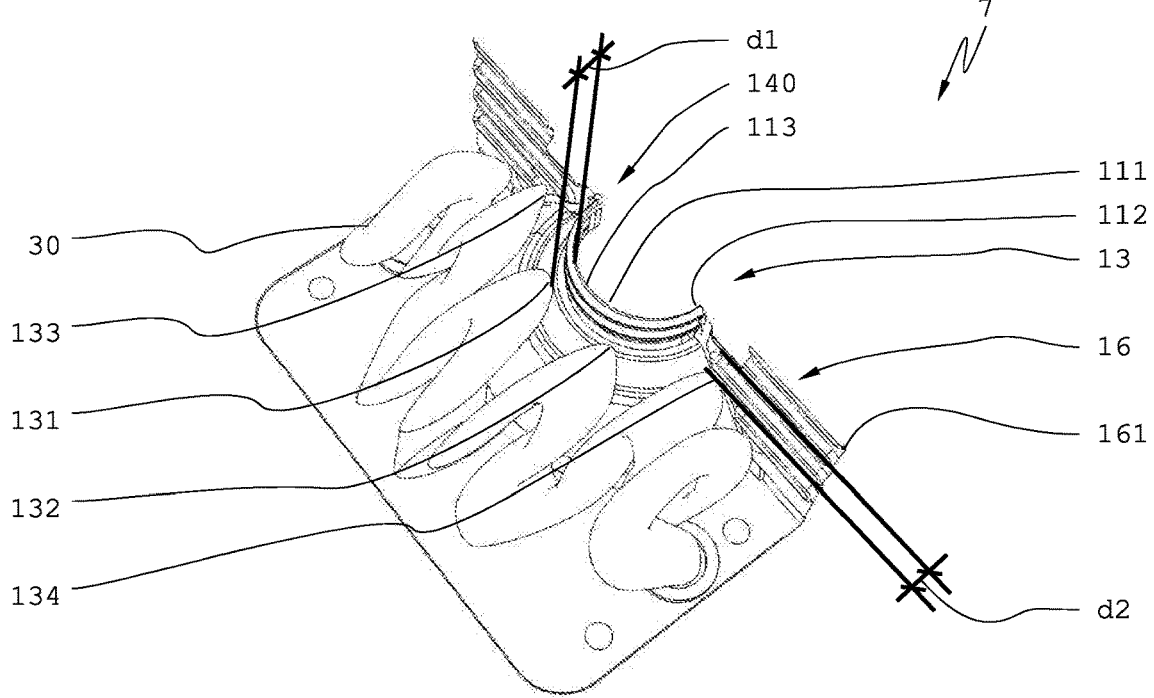
Figure 5:
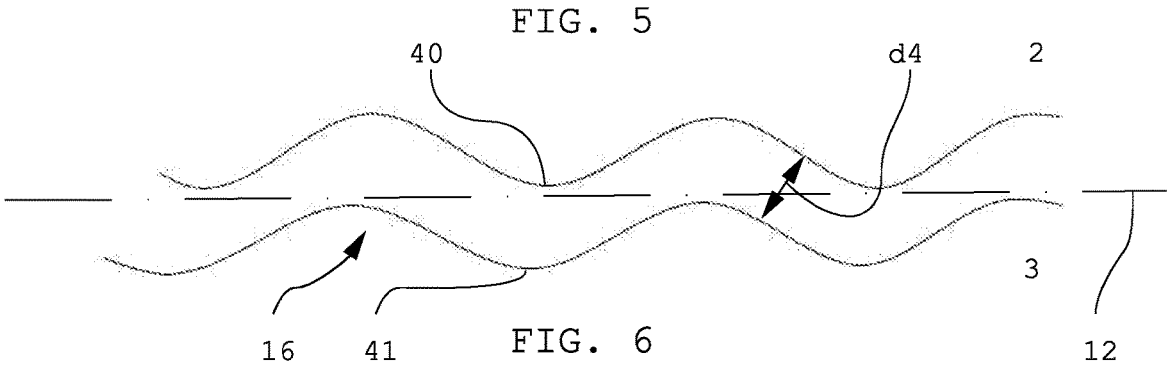

The invention is explained in greater detail with reference to an exemplary embodiment on the basis of figures which are shown only schematically. In the figures:

FIG. 1: shows a 3D representation of an opened blow mold with a mold body with two mold nests;

FIG. 2: shows a 3D representation of a mold body;

FIG. 3: shows a 3D representation of an arrangement of temperature control channels in the mold body known from FIG. 2;

FIG. 4: shows a 3D representation of a temperature control channel in a neck/shoulder insert;

FIG. 5: shows a front view of an open blow mold half; and

FIG. 6: shows a section through a serrated channel of a slug chamber formed in the bottom region of the blow mold.

FIG. 1 shows a 3D representation of an opened blow mold 1 to explain the basic structure of such a mold. The blow mold, which as a whole is provided with reference sign 1, comprises a first blow mold half 2 and a second blow mold half 3. In the present case, said blow mold halves are laterally displaceable relative to one another in order to open and close the blow mold 1 periodically. Each blow mold half 2, 3 comprises a baseplate 4, which forms part of a closing unit of a blow molding machine. Arranged on the baseplate 4 is a mold body 10 in which one or more mold cavities 11 are formed. According to the shown exemplary embodiment, the mold body 10 has two mold cavities 11, each defining one half of the shape of a body of a plastic container. Since the mold cavities 11 correspond to one another, for better clarity the two mold cavities 11 are not provided with all reference signs, although the explanations apply in each case to both mold cavities 11.

The inner wall 111 forms threaded sections (not shown here) in the neck/shoulder insert 7 for fixing a closure of the plastic container. In the present embodiment, only the neck is formed by the neck/shoulder insert 7. For the formation of the shoulder region 13, a separate shoulder insert is used which, however, is not shown in the present figure. In the case of the blow mold 1 for an extrusion blow-molding machine, a neck blade 9 for separating an extruded plastic parison inserted into the blow mold 1 can also be provided on the head/shoulder insert 7. A bottom region 14 designed as a base insert 6 closes the mold cavity 11 at the end of the mold body 10 opposite the head plate 7. A slug chamber 16 in the region of the separating plane 12 is formed both on the insertion parts of the neck/shoulder insert 7 and also on the bottom region 14. The slug chamber 16 extends beyond the neck/shoulder insert 7 and the bottom insert 17 into the separating plane 12 of the mold body 10. Venting slots 23 can be formed on the mutually facing surfaces 21, 22 of the blow mold halves 2, 3 which define a separating plane 12 of the blow mold 1. On the one blow mold half 3, guide pins 24 are formed which slide into guide bushes 25 of the other blow mold half 2 when the blow mold halves 2, 3 are closed. An inner wall 111 delimits the mold cavity 11 of the mold body 10. In the region of the separating plane 12, the inner wall 111 has a first region 112 and a second region 113 which is adjacent to the first region 112, substantially perpendicular thereto.

FIG. 2 shows a 3D representation of a mold body 10 having only one mold cavity 11 with an inner wall 111. As already stated above, the inner wall 111 has a first region 112 in the region of the separating plane 12 on the insertion parts of the neck/shoulder region 7 and the bottom region 14, and a second region 113 which is substantially perpendicular thereto and is adjacent to the first region 112. The representation of the slug chambers has been omitted. The mold body 10 has a neck/shoulder region 13, a bottom region 14, and a central region 15, wherein the central region 15 additionally has a handle region 40. A plurality of temperature control channels 30 are arranged within the mold body 10 and form one or more temperature control circuits. The temperature control channels 30 are each at an individual distance from the inner wall 111. In this illustration, the temperature control channels 30 are only shown in dashed lines. The temperature control channels 30 are arranged in such a way that a separate temperature control circuit is arranged in the shoulder region 13, in the bottom region 14, and in the central region 15. The temperature control channels 30 in the central region 15 are conventionally produced by drilling and milling. The temperature control channels 30 in the bottom region 14 and in the neck/shoulder region 13 are manufactured generatively. For this purpose, a floor insert 6 is arranged in the bottom region 14. Accordingly, a separate neck/shoulder insert 7 is arranged in the shoulder region 13. The neck/shoulder insert 7 and the bottom insert 6 are each manufactured from steel by means of a selective laser melting method, wherein the corresponding temperature control channels 30 are formed by means of this selective laser melting method. The temperature control channels 30 in the bottom region 14 are helical. The temperature control channels 30 in the neck/shoulder region 13 are designed with a contour closely corresponding to the contour of the blown container. Both in the neck/shoulder region 13 and in the bottom region 14, the density of the temperature control channels 30 per surface area of the inner wall 111 of the mold cavity 11 is higher than in the central region 15. This enables a greater withdrawal of heat in relation to the heat dissipation from the central region 15. As already discussed herein, the heat input from the preform via the blown container into the mold body 10 is higher in the neck/shoulder region 13 and in the bottom region 14 than in the central region 15. In order to cool the blown container uniformly, more heat must be removed from these two regions than from the central region 15. This is achieved with the higher density of the temperature control channels 30 which preferably extend as close as possible along the inner wall 111 of the mold cavity 11. Although not explicitly shown, it is, however, easily conceivable that more heat can be extracted from the handle region 40 by another insert part with a generatively an additively manufactured temperature control channel 30 analogous to the neck/shoulder insert 7 and/or the floor insert 6 than the remaining central body 15 surrounding the handle region 40.

FIG. 3 shows a 3D representation of an arrangement of temperature control channels 30 in the mold body 10 known from FIG. 2. The mold body with the mold cavity 11 and its inner wall 111 is shown only in dashed lines. A plurality of temperature control channels 30 are arranged within the mold body 10 and form one or more temperature control circuits. The temperature control channels 30 in the bottom region 14 are fluidically connected to a central feed and a central return. The temperature control channels 30 of the central region 15 and the neck/shoulder insert 7 are also connected in parallel and connected in a fluid-communicating manner to the central feed and the central return. This enables the production of an individual flow cross section for the temperature control fluid for the neck/shoulder region 13, the central region 15, and the bottom region 14. Individual flow rates of the temperature-control fluid, and therefore also an individual heat dissipation, can therefore be produced in the temperature-control channels 30 of the individual regions 13, 14, 15. In the present embodiment, more heat is extracted from the inner wall 111 in the neck/shoulder region 13 and in the bottom region 14 by the temperature control fluid than the inner wall 111 in the central region 15.

FIG. 4 shows a 3D representation of a temperature control channel in a neck/shoulder insert 7. The inner wall 111 of the neck/shoulder insert 7 is formed in a first partial region as a threaded section for fixing a closure cap of the later container. Adjoining this first partial region is a widening second partial region, wherein the first and second partial regions together form the neck/shoulder region 13. The slug chamber 16 is formed adjacent to the inner wall 111 of the neck/shoulder region 13, and excess material of the parison is received therein during the formation of the neck/shoulder region 13. The temperature control channel 30 generatively manufactured by means of selective laser melting is formed within the neck/shoulder insert 7. The temperature control channel 30 has a three-dimensional meandering profile. It is clearly visible that a first distance d1 between the inner wall 111 in the neck region 130 and the bends 131, 132 of the meandering temperature control channel 30 provided for cooling the neck region 130 is greater than a second distance d2 between a boundary surface 161 of the slug chamber 16 and the bends 133, 134 of the meandering temperature control channel 30 provided for cooling the slug chamber 16. This arrangement makes it possible for the temperature control channel 30 of the slug chamber 16 or its boundary surface 161 to extract more heat from the first region 112 of the inner wall 111 than the second region 113 of the inner wall 111 adjacent to the first region 112. As a result of the non-uniform heat removal, more heat is extracted from a slug and the first region of the neck/shoulder region of a hollow blown body produced in this blow mold that is adjacent to the slug than a second region adjacent to the first region and standing substantially perpendicular to the first region. Stresses in particular in the neck and shoulder region of the hollow blown body are therefore at least largely if not entirely prevented after removal from the blow mold.

FIG. 5 shows a front view of a blow mold half 2, the mold cavity 11 of which is a negative of a half of a bottle with a grip. Slug chambers 16 adjoin the inner wall 111 of the cavity 11 at the shoulder/neck region 13 and in the bottom region 14. The slug chambers 16 have spikes 40 formed as elevations and channels 41 designed as depressions which are arranged alternately parallel to one another in each slug chamber 16. A center line I-I of the spike and the channel 41 and the inner wall 111 of the mold cavity 11 enclose an angle a which is between greater than 0° and 90° and is ideally between approximately 45° and 90°. A distance d3 between the adjacent spikes 40 is the same within a slug chamber 16.

FIG. 6 shows a section through the slug chamber 16 of the bottom region 14 with closed blow mold halves 2, 3. The separating plane 12 is indicated by a dot-dashed line. The spikes 40 of the one blow mold half 2 are opposite the channels 41 of the other blow mold half 3, so that a distance d4 resulting between the spikes 40 and the channels 41 is substantially the same over the length of the slug chamber 16. By means of this arrangement, on the one hand effective pressing of the parison walls against each other is possible and, on the other hand, full-surface contact with a wall 161 of the slug chamber 16 so that its heat can be reliably introduced into the blow mold halves 2, 3. On the other hand, the S-shaped profile generates an inherent stability of the slug so that it can easily be removed from the hollow blown body after the removal from the blow mold. The distance d4 substantially results from the wall thickness of the plastic parison and is generally smaller than twice the wall thickness.

The invention claimed is:

1. A mold body for a blow mold (1), wherein the mold body (10) has a bottom region (14), a shoulder region (13), a central region (15) and a separating plane (12), and at least one mold cavity (11) with an inner wall (111) is arranged in the mold body (10), wherein at least one temperature control channel (30) is enclosed within the mold body (10), wherein the at least one temperature control channel (30) is at least one of situated and positioned in the mold body (10) in such a way as to remove more heat from and/or to supply more heat to a first region (112) of the inner wall (111) than a second region (113) of the inner wall (111) that is adjacent to the first region (112).

2. The mold body (10) according to claim 1, wherein the at least one temperature control channel extends through both the first and the second regions of the mold body, the first region (112) of the inner wall (111) adjoins the separating plane (12), and the second region (113) of the inner wall (111) is perpendicular to the separating plane (12).

3. The mold body (10) according to claim 1, wherein the removal of heat and/or the supply of heat decreases steadily from the first region (112) of the inner wall (111) to the second region (113) of the inner wall (111), and vice versa.

4. The mold body (10) according to claim 1, wherein the removal of heat through the at least one temperature control channel (30) from a slug chamber (16) that is arranged in the mold cavity (11) and/or from a slug chamber (16) that is adjacent to the mold cavity (11) and is formed in the mold body (10) at the separating plane (12) and is connected to the mold cavity (11) via a gap formed by a pinch edge, is greater than from the second region (112).

5. The mold body (10) according to claim 4, wherein the at least one temperature control channel (30) is arranged in the mold body (10) in a region of the slug chamber (16).

6. The mold body (10) according to claim 4, wherein the slug chamber (16) has alternating spikes (40) and channels (41), wherein when blow mold halves (2, 3) of blow mold are closed, the spikes of one blow mold half (2) are opposite the channels of the other blow mold half (3).

7. The mold body (10) according to claim 1, wherein the at least one temperature control channel (30) is delimited by the mold body and has a non-circular cross section which is constant at least in one section, wherein the at least one section is arranged twisted in the mold body.

8. The mold body (10) according to claim 1, wherein the at least one temperature control channel (30) is produced at least partially in an additive manufacturing method such the at least one temperature control channel has a three-dimensionally meandering profile.

9. The mold body (10) according to claim 8, wherein the additive manufacturing method includes selective laser melting and a thermal spraying method and the at least one temperature control channel is completely embedded in the blow mold.

10. The mold body (10) according to claim 1, wherein the at least one temperature control channel (30) is arranged in at least one of a neck region and the shoulder region (13) of the mold body (10).

11. The mold body (10) according to claim 1, wherein the at least one temperature control channel (30) is arranged in the bottom region (14) of the mold body (10).

12. The mold body (10) according to claim 1, wherein the at least one temperature control channel (30) is arranged in a handle region.

13. The mold body (10) according to claim 1, wherein a wall thickness between the at least one temperature control channel (30) and at least one of the corresponding inner wall (111), the separating plane (12) and a slug chamber (16) is at least 1.5 mm.

14. The mold body (10) according to claim 1, wherein the mold body (10) is formed in multiple parts, and has at least one of a neck/shoulder region (13), the bottom region (14), and a handle region that are formed independently from each other.

15. The mold body (10) according to claim 14, wherein the at least one temperature control channel (30) is arranged in one of the neck/shoulder region, the bottom region (14) or the handle region (13), wherein the region, in which the at least on temperature control channel (30) is arranged, is produced in an additive manufacturing method.

16. The mold body (10) according to claim 1, wherein the central region (15) of the mold body (10) is produced in a conventional production method or in an additive manufacturing method, such that the at least one temperature control channel extends parallel to an inner wall of the mold cavity.

17. The mold body (10) according to claim 1, wherein the at least one temperature control channel (30) has a cross section which varies along a flow direction such that a temperature control fluid flows therethrough at different flow rates.

18. The mold body (10) according to claim 1, wherein the at least one temperature control channel (30) has a curved profile.

19. The mold body (10) according to claim 1, wherein at least one of the bottom region (14), a neck/shoulder region (13), the central region (15), and a handle region have a separate temperature control circuit.

20. The mold body (10) according to claim 1, wherein the at least one temperature control channel (30) has at least one sub-section connected in parallel.

21. A blow mold (1) comprising at least one mold body (10) according to claim 1.

* * * * *